United States Patent
Alexandre et al.

(10) Patent No.: US 9,290,676 B2
(45) Date of Patent: Mar. 22, 2016

(54) FIREPROOF COMPOSITION

(71) Applicants: Michael Alexandre, Ougree (BE); Philippe Dubois, Braives (BE); Myriam Devalckenaere, Vertain (FR); Michael Claes, Romsee (BE)

(72) Inventors: Michael Alexandre, Ougree (BE); Philippe Dubois, Braives (BE); Myriam Devalckenaere, Vertain (FR); Michael Claes, Romsee (BE)

(73) Assignee: Nanocyl S.A., Sambreville (BE)

( * ) Notice: Subject to any disclaimer, the term of this patent is extended or adjusted under 35 U.S.C. 154(b) by 395 days.

(21) Appl. No.: 13/681,695

(22) Filed: Nov. 20, 2012

(65) Prior Publication Data

US 2013/0142960 A1    Jun. 6, 2013

Related U.S. Application Data

(62) Division of application No. 12/090,560, filed as application No. PCT/BE2006/000108 on Oct. 3, 2006, now abandoned.

(60) Provisional application No. 60/731,008, filed on Oct. 28, 2005, provisional application No. 60/731,363, filed on Oct. 28, 2005, provisional application No. 60/780,022, filed on Mar. 6, 2006.

(51) Int. Cl.
C07C 51/353 (2006.01)
C09D 183/06 (2006.01)
C08K 7/24 (2006.01)

(52) U.S. Cl.
CPC ............... *C09D 183/06* (2013.01); *C08K 7/24* (2013.01)

(58) Field of Classification Search
USPC ........................................ 562/495
See application file for complete search history.

(56) References Cited

U.S. PATENT DOCUMENTS 3,884,866 A * 5/1975 Jeram et al. .................. 523/203

FOREIGN PATENT DOCUMENTS

BE    WO03078315    *  9/2003    ............ C08K 3/34

* cited by examiner

*Primary Examiner* — Ling Choi
*Assistant Examiner* — Thuy-Al Nguyen
(74) *Attorney, Agent, or Firm* — Reinhart Boerner Van Deuren P.C.

(57) ABSTRACT

The present invention concerns a fireproof composition consisting of reticulated polysiloxane and raw carbon nanotubes with a "bound rubber" value greater than or equal to 15 grams of carbon nanotube, said carbon nanotubes representing between 0.05 and 1% of the total weight of said composition.

16 Claims, 8 Drawing Sheets

FIREPROOF COMPOSITION

CROSS-REFERENCE TO RELATED PATENT APPLICATIONS

This patent application is a divisional of co-pending U.S. patent application Ser. No. 12/090,560, filed Apr. 17, 2008, now pending, which is a National Stage of PCT/BE2006/000108, filed Oct. 3, 2006, which claims priority to U.S. Provisional Patent Application No. 60/780,022, filed Mar. 6, 2006, and U.S. Provisional Patent Application No. 60/731,363, filed Oct. 28, 2005, and U.S. Provisional Patent Application No. 60/731,008, filed Oct. 28, 2005, the entire teachings and disclosure of which are incorporated herein by reference thereto.

SUBJECT OF THE INVENTION

The present invention concerns a composition comprising a reticulated polymer and carbon nanotubes as well as a method of making use of this composition. The composition according to the invention has surprising viscosimetric and fire-resistant properties that allow it to be used respectively in the form of a fire-resistant protective coating and in the form of a fireproof seal.

STATE OF THE ART

In aeronautics, traditional paints are normally applied by spraying by means of a spray gun. For polymer-based coatings, this technique is difficult to transpose because the polymers used have a pasty consistency. The application of this type of coating can therefore pose a certain number of practical problems.

Just like the paints, the seals must have particular properties of viscosity. On the one hand they must be flexible enough so as to be easily applied and on the other hand they must be then fixed enough to retain their shape while following any possible deformations of the materials that they link.

Another problem is that of fire resistance of the materials over time and in particular in the field of aeronautics. An attempt is usually made to increase the fire resistance of certain metal parts of an airplane by applying a coating so as to delay the heating up of the metal part that it protects as much as possible.

The seals that link the fire-resistant materials together offer moreover another angle of attack for the fire. These seals, which are not or hardly fireproof in comparison with the materials that they link, may indeed begin to melt well before the critical temperature level of the materials is reached. In this case, the advantage of the fireproof material is reduced.

Traditional fire-resistant coatings are normally polymers highly filled with inert material or filled with a substance likely to react to the heat and to form a passivation layer protecting the metal parts from a too fast heating. The disadvantage of the use of this type of coating is the fact that the quantity of the required filler is normally higher than 10%, which has the effect of altering the mechanical properties of the polymers used and of making them less flexible. But a fire-resistant coating has to follow the movements and thermal expansion of the elements to which it is applied. If not, cracks may appear and offer points of attack for the fire.

In order to preserve the physical and mechanical properties of a fire-resistant polymer while retaining its flame-resistant properties, it has been proposed that carbon nanotubes be incorporated into the polymer.

Document WO 03/070821 describes a composition containing carbon nanotubes at a level of 10 to 60% by volume.

It has also been proposed that, in addition to carbon nanotubes, other flame retardants, as described in document EP 1 471 114, or phyllosilicates, also known as clay platelet fillers, as described in document WO 03/078315, be incorporated.

However, in order to obtain good fire resistance properties, the percentage of the additional fillers of the polymer remains high. Moreover, such fire-resistant polymers do not have a consistency suitable for their application in the form of a coating or a seal.

AIMS OF THE INVENTION

The present invention aims at providing a composition and a method for obtaining a coating or a seal which does not have the disadvantages of the compositions of the state of the art.

In particular, the present invention aims at providing a composition which contains a small quantity of additional filler and which is flexible and easy to apply.

The present invention also aims at providing a coating which gives the elements on which it is applied an excellent heat resistance and a seal that also resists heat very well so as to keep attached all the elements that it holds together.

The present invention also proposes a method for obtaining such a fire-resistant coating or seal.

SUMMARY OF THE INVENTION

The present invention discloses a fire-resistant composition containing reticulated polysiloxane and raw carbon nanotubes with a value of bound rubber greater than or equal to 15 grams per gram of carbon nanotube, said carbon nanotubes representing 0.05 and 1% of the total weight of said composition.

According to particular embodiments, the invention has one or more of the following characteristics:
  the percentage by weight of said raw carbon nanotubes is between 0.25 and 0.5% of the total weight of said composition;
  the consistency of the polysiloxane is suitable for an application by brush or extrusion gun;
  the raw carbon nanotubes are chosen from among the group of single-wall carbon nanotubes (SWNTs), double-wall carbon nanotubes (DWNTs) or multi-wall carbon nanotubes (MWNTs).

The invention also discloses a method for obtaining a composition as in claim 1 comprising the following stages:
a) production of a first mixture by bringing together a precursor A containing:
  a polysiloxane containing vinyl groups,
  carbon nanotubes with a proportion by weight of between 0.05 and 1% of the weight of the final product;
b) addition of a precursor B comprising a polysiloxane with hydrosilane groups, to the first mixture obtained in stage a);
c) creation of the reticulation of the mixture obtained in stage b).

According to particular embodiments, the method has the following characteristics:
  the reticulation of the mixture is brought about by a thermal, chemical or photochemical action;
  the proportion by weight of the carbon nanotubes in the method is between 0.25 and 0.5% of the weight of the final product;
  the method includes a stage of degassing of the first mixture before it is added in stage b);
  said degassing stage is brought about by the vacuum effect.

The invention moreover discloses:
- the use of the composition according to the invention as a fire-resistant protective coating;
- the use of the composition according to the invention as a fireproof seal;
- the use of the composition according to the invention as a coating.

DEFINITION

By raw nanotubes we mean carbon nanotubes that have not gone through any post-synthesis treatment such as a possible purification by acid and/or base treatment, a reheating at high temperature, a cutting, a dispersion etc.

DETAILED DESCRIPTION OF THE INVENTION

To solve the double problem of obtaining a coating and a seal with a low filler rate and which is flexible and easy to apply and also has good fire-resistant properties, the invention proposes in an original manner the use of raw carbon nanotubes with a value greater than or equal to 15 grams per gram of carbon nanotubes in the "bound rubber" test in a reticulated polysiloxane-based polymer.

The raw carbon nanotubes are nanotubes that have not gone through any post-synthesis treatment.

According to a preferred embodiment according to the invention, the polymer used is the Slygard 184 of Dow Corning, a resin that reticulates by hydrosilylation at high temperature.

By resin that reticulates by hydrosilylation we mean a resin obtained from two precursors of a polysiloxane type, one containing vinyl groups and the other containing hydrosilane groups.

Figure 1:
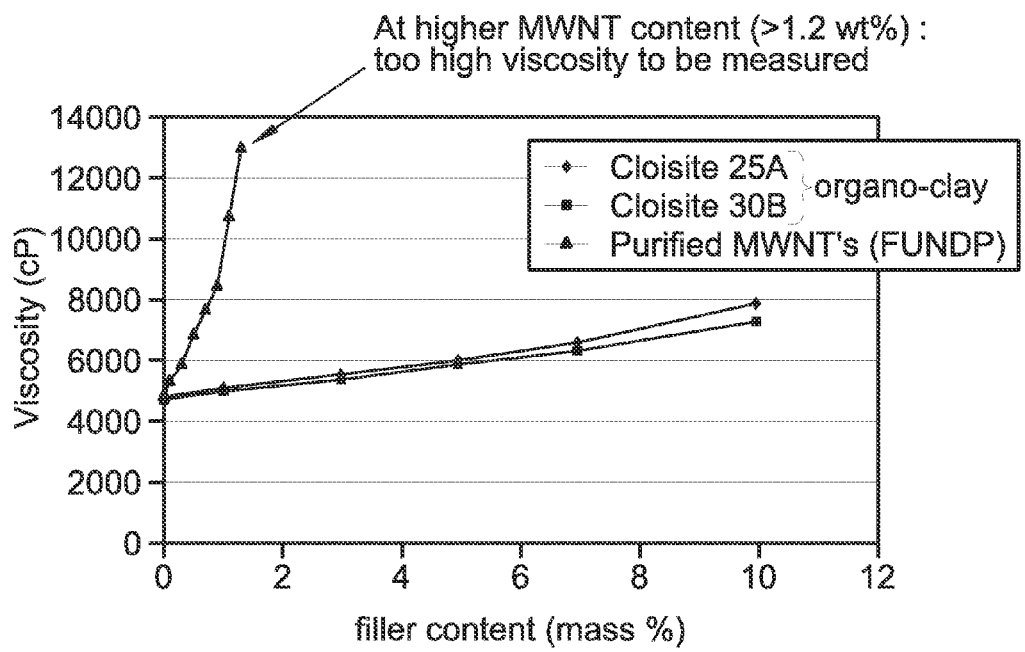
FIG. 1 shows the increase in viscosity of the precursor of the polymer according to the quantity of the filler for composites containing either carbon nanotubes or clay fillers.

The reticulation, which occurs at 105° C., consists of a reaction of addition of the hydrosilane groups to the vinyl groups (FIG. 1).

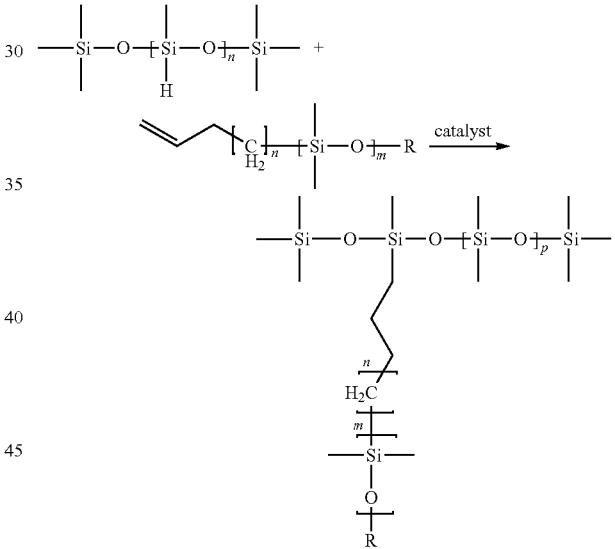

FIG. 1

The composition of the Slygard 184 resin of Dow Corning is given in Table 1 and the chemical structure of the constituents is given in FIGS. 2 to 5.

TABLE 1

| Composition of the resin | | |
|---|---|---|
| | Precursor A | Precursor B |
| Constituent 1 Nature and percentage | PDMS Vinyl terminated SFD 117 67% | Si-H polymer (0.76% of H, MDD (H)) 60% |
| Constituent 2 Nature and percentage | VQM 1 (2% vinyl) 31% | SFD 117 39% |
| Constituent 3 Nature and | Platinum catalyst 0.14% | Methyl cyclotetra siloxane inhibitor |

TABLE 1-continued

Composition of the resin

| | Precursor A | Precursor B |
|---|---|---|
| percentage | | 1% |
| Other constituents | Cyclic compounds and volatile low molecular weight silicone (1.5%) and xylene (0.7%) | |
| Dynamic viscosity | 4817 cP | 89.1 cP |

FIG. 2

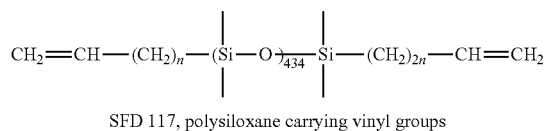

SFD 117, polysiloxane carrying vinyl groups

FIG. 3

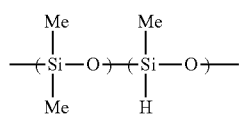

Polymer of polysiloxane type carrying hydrosilane groups

FIG. 4

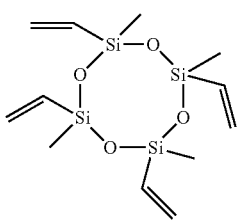

Reticulation inhibitor

Schema 5

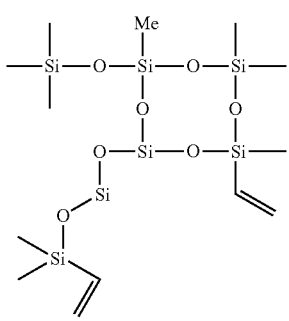

VQM matrix containing a polydimethyl siloxane micronetwork

The effect of the carbon nanotubes on the viscosity of the constituents of the polymer, in which they are incorporated, in particular that of precursor A, is shown in FIG. 1. The viscosity of precursor A containing multi-wall carbon nanotubes is noticeably increased in comparison with more traditional compositions containing clay fillers.

Figure 2:
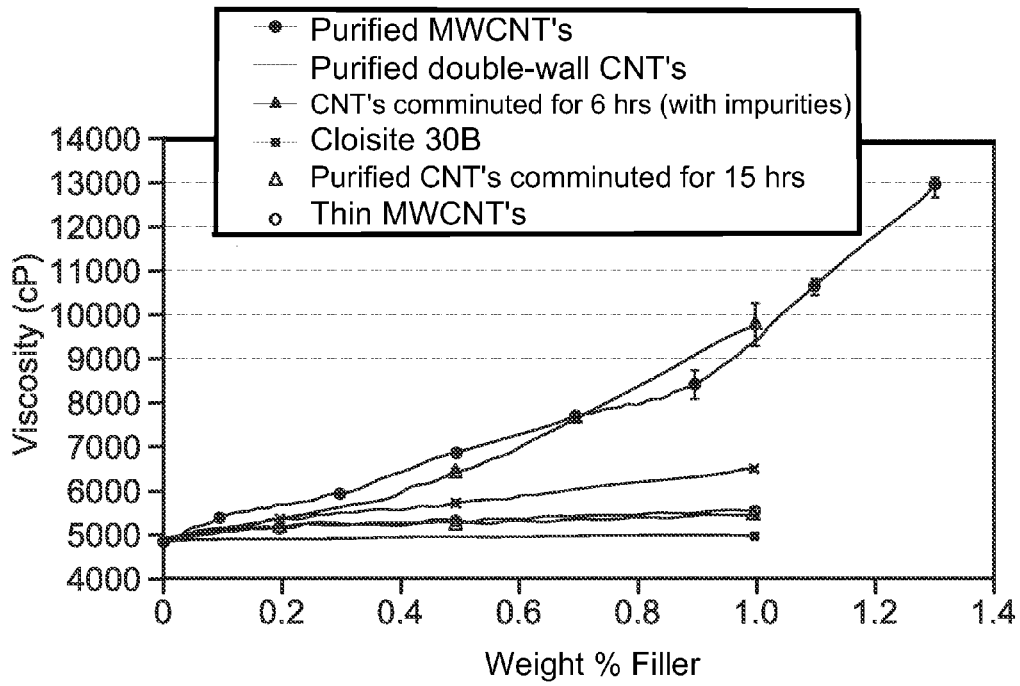
FIG. 2 shows the variation in viscosity of the precursor of the polymer according to the quantity of the filler for composites containing carbon nanotubes of various types.
Figure 3:
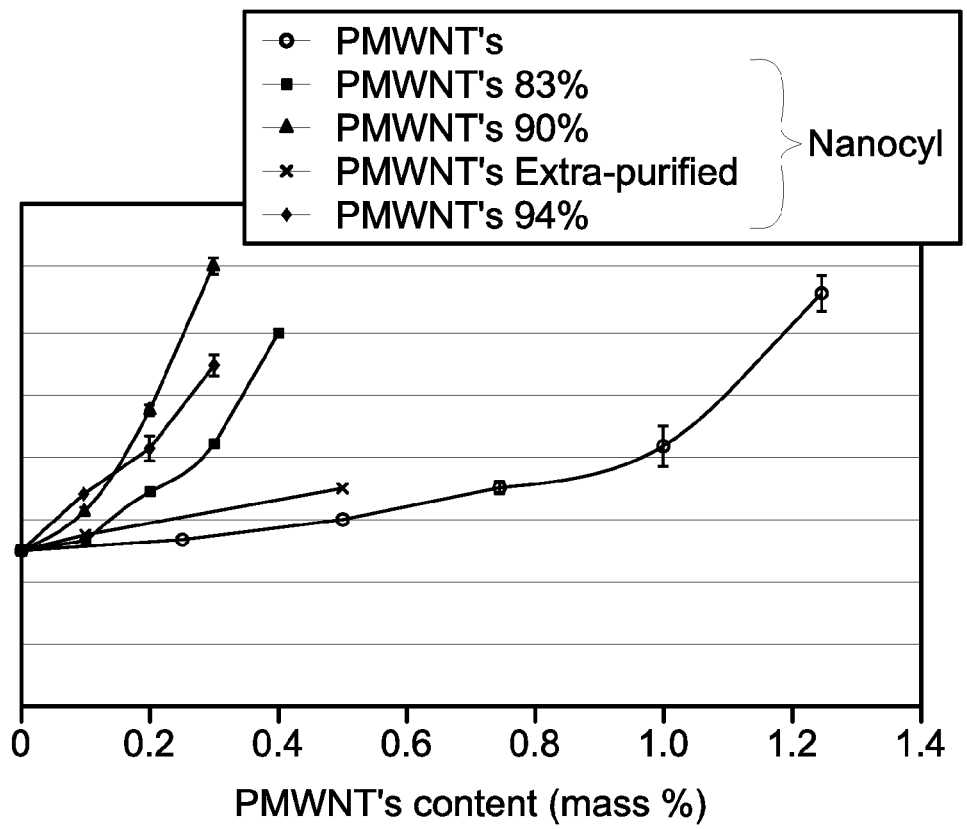
FIG. 3 shows the variation in viscosity of the precursor of the polymer according to the percentage by weight of the carbon nanotubes for composites containing carbon nanotubes of various purities.
Figure 4:
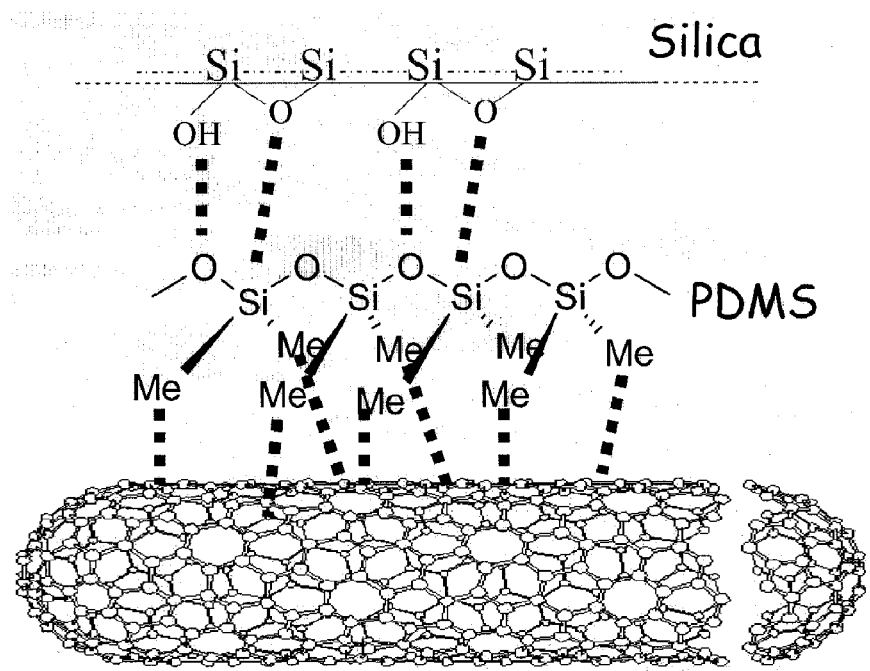
FIG. 4 shows schematically the interactions between the carbon nanotubes and the polymer matrix.

As FIGS. 2 and 3 show, the viscosity of precursor A varies according to various parameters such as the size, diameter and purity of the carbon nanotubes.

It appears that a filler level of less than 1% by weight of carbon nanotubes allows a significant increase in the viscosity and more particularly with raw carbon nanotubes. The latter bring about a significant increase in the viscosity of the polymer with very low filler levels contained between 0.2 and 0.3% by weight, as FIG. 3 shows. This surprising increase in viscosity is explained by the very great affinity of raw carbon nanotubes with the polysiloxane polymer (FIG. 4), as the measurements taken by means of the test known as the "bound rubber" test show (Table 2). The experimental procedure for this test consists of extracting 3.5 g of the precursor A/carbon nanotubes mixture with 30 mL of solvent (heptane) during 4 hours at 25° C. After centrifuging and evaporation of the solvent, the dry residue is weighed in order to determine the quantity of PDMS polymer bonded to the carbon nanotubes.

TABLE 2

Affinity of the carbon nanotubes for the polymer matrix of the composition

| Composition of the system | Content of bonded PDMS by gram of filler (in g) | Conclusions |
|---|---|---|
| 0.5% NC 7000 | 21 ± 3 | Very good affinity between the PDMS and the raw carbon nanotubes |
| Montmorillonite | ~0.1 | No affinity |
| Sepiolite | 2.5 | Limited affinity |

Figure 5:
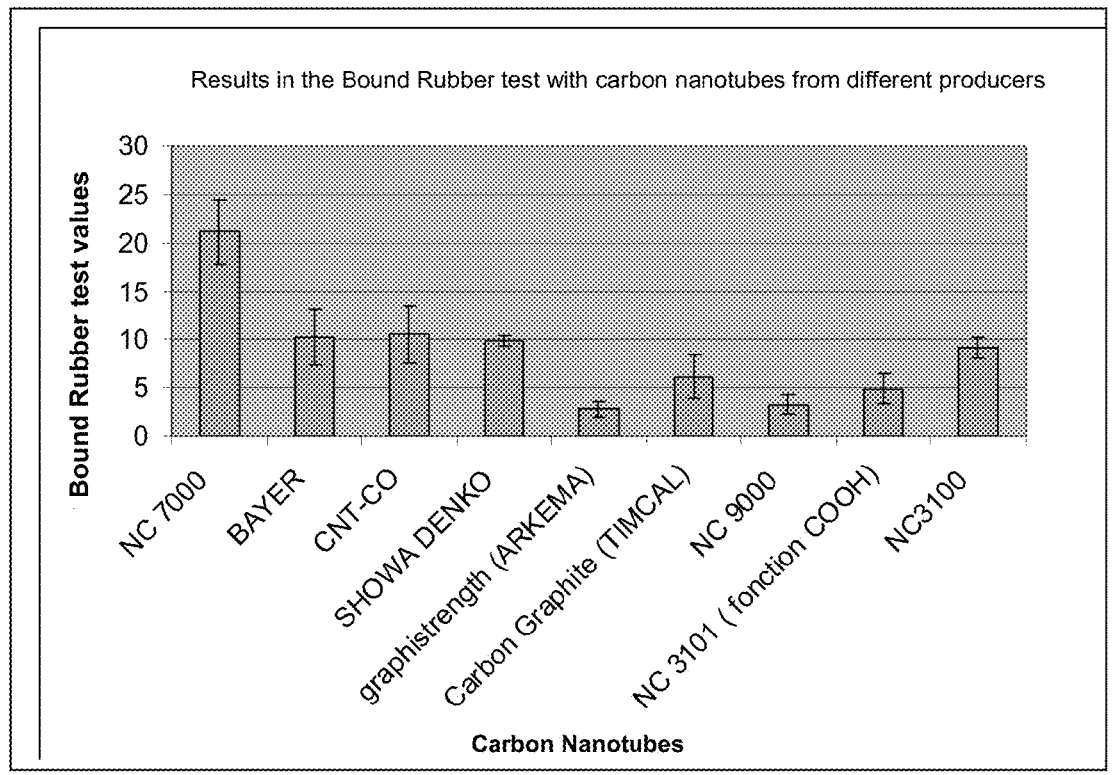
FIG. 5 shows the values from the bound rubber test of a polysiloxane-based composition comprising a PDMS matrix containing vinyl groups according to the carbon nanotubes from various producers. The NC 7000, NC 9000, NC 3100 and NC 3101 carbon nanotubes produced by the inventor of the present invention are respectively multi-wall carbon nanotubes that are raw (NC 7000), coated in polyethylene (NC 9000), purified (NC 3100) and purified, then functionalised with COOH (NC 3101).

This table shows that the raw nanotubes have a much greater affinity with the precursor A in comparison with clays (sepiolite and montmorillonite). FIG. 5 compares the results from the bound rubber test for carbon nanotubes from various producers. It appears clearly that the Nanocyl raw carbon nanotube achieves a significantly higher value in comparison with the other nanotubes.

The viscosimetric properties of precursor A with a low filler of carbon nanotubes allow this precursor to be applied by brush so as to coat the surface of a material. Surprisingly, even with this low filler level of carbon nanotubes, the composition obtained after reticulation shows a significant fire-resistant effect.

The capacity for fire resistance of the composition according to the invention has been studied by means of a test based on the ISO 2685 test used in aeronautics.

Figure 6:
FIG. 6 shows the fire test bench in use.
Figure 7:
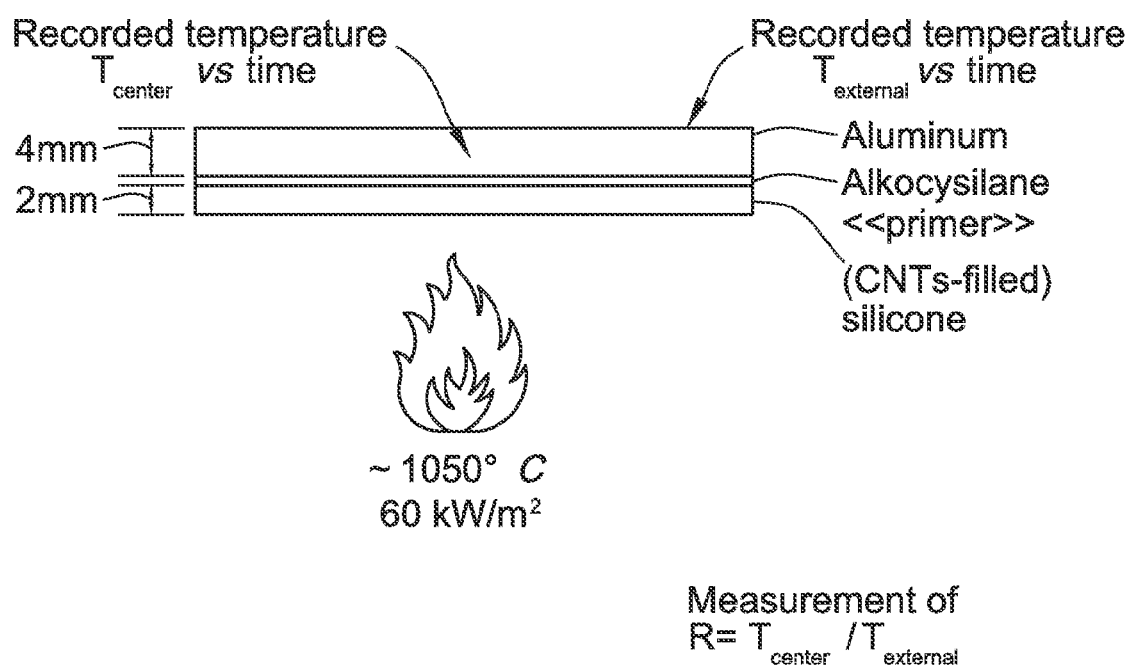
FIG. 7 is a schematic representation of the test bench of FIG. 6.

The test is performed with the aid of a 5 cm-diameter Bunsen burner (FIG. 6). The aluminium plate covered or not covered with the composition, with a surface of 145*145 mm and a thickness of 4 mm, is placed 2 cm above the burner. It is held by two horizontal metal bars positioned at each end of the plate. A thermocouple continuously measures the temperature at the centre of the plate on the side with uncoated aluminium.

The fire test is timed and the temperature is recorded every two or three minutes.

In order to allow the tracking of the conditions and the progress of the fire test, the burner's heating power is determined by the following method: the temperature of the flame is first measured, then a known quantity of water (for example 700 cl or 700 g) is heated on the flame in a crystallising dish positioned at a height equivalent to that where the plate is positioned, and its temperature is recorded at regular intervals (for example every 15 seconds). A graph of the water temperature according to time can then be drawn. According to the following formula, the heating power ($P_{heat}$) is expressed in kW:

$$P_{heat} = m_{water} * C_{Pwater} * dT/dt,$$

where dT/dt corresponds to the gradient of the curve of the temperature according to time, $C_{Pwater}=4.185^{kJ}$/kg·K and $m_{water}$ corresponds to the mass of water expressed in kg. By taking into account the section of the crystallising dish ($S=\pi R^2$, expressed in $m^2$), the heating power is typically about 70+/−5 $kW/m^2$, while the temperature of the flame is about 1,000° C.

Thus, during each series of fire tests, the heating power is measured and a fresh aluminium plate is tested. These two operations allow one to know the power of the burner and to check that its power does not vary from one test to another. Before the plate to be tested is burnt, the temperature of the flame is measured.
During the test, the temperature of the supported thermocouple in contact with the top of the plate is measured every two or three minutes. The following observations are then noted: presence or absence of smokes, detachment of a piece or of a layer of the coating, the appearance of the coating, the start of incurvation of the plate.

The test ends when the thermocouple breaks through the plate or the plate curves in until it touches the burner. If that does not occur after 90 minutes of testing, the test is stopped.

A graph of the change in temperature of the plate according to time is drawn, thus allowing the comparison of several formulations and the identification of the most effective ones.

Figure 8:
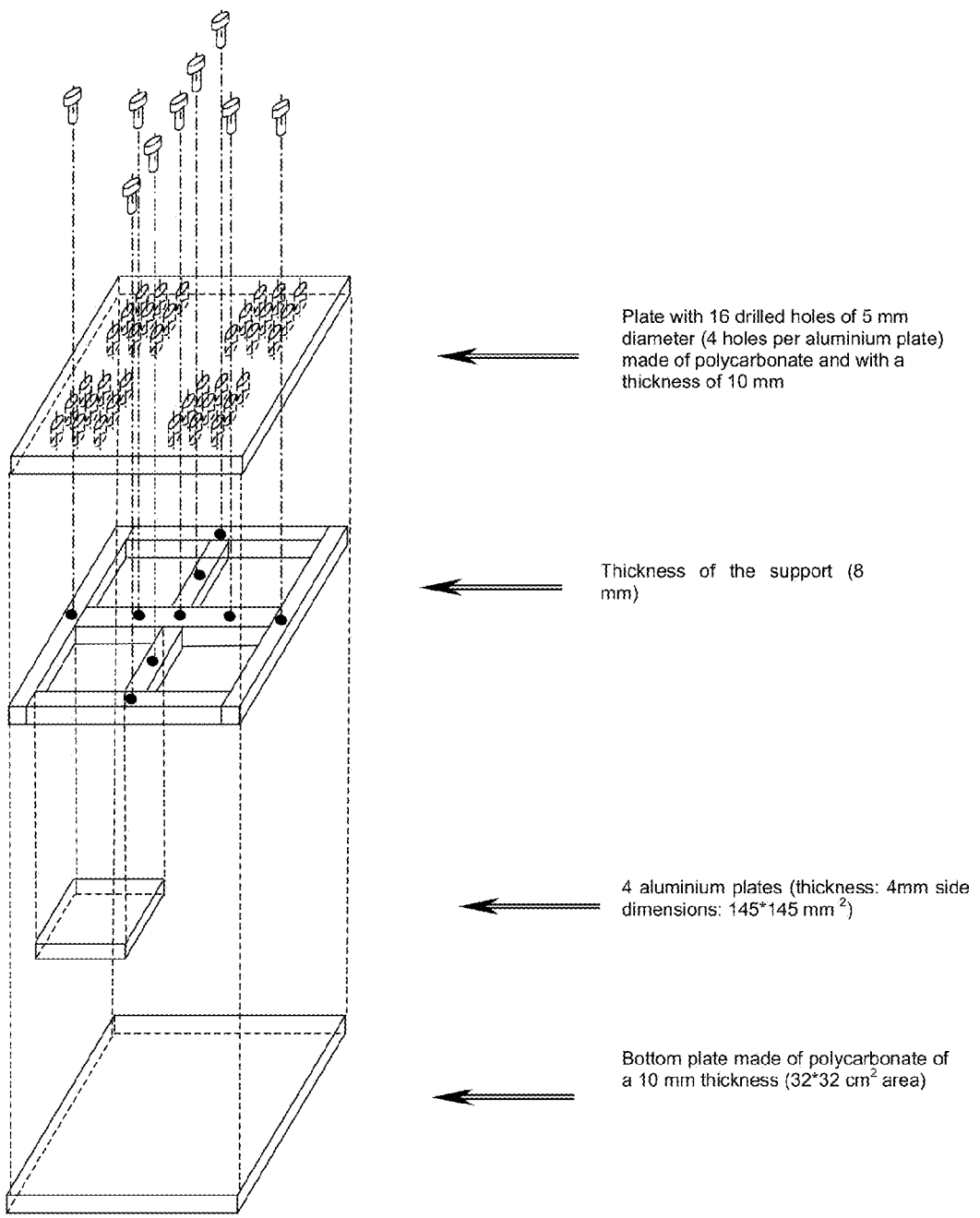
FIG. 8 shows schematically a mould used to produce aluminium plates coated with the fire-resistant coating according to the invention.

The elements, to which the fire-resistant composition according to the invention is applied and which are preferably aluminium plates are preferably produced by means of a mould (FIG. 8). The mould is assembled by means of 24 screws (not all of which are shown) positioned on the contour and the spacing rods.

The aluminium plates are preferably produced in a place thermostatically controlled to 20° C. and which has a humidity level of between 50 and 65%.

The various stages for producing an aluminium plate intended for a fire test are the following:
1) Preparation of the precursor A and carbon nanotube mixture for 2 hrs at ambient temperature by means of a stirring rod rotating at 1,200 revolutions per minute;
2) Cleaning of the aluminium plates with dichloro-ethane, then with methyl ethyl ketone or 2-butanone and, after evaporation of the solvent, the application of a primer (1200 OS from Dow Corning) to ensure adhesion between the coating and the aluminium;
3) Degassing of the precursor A and carbon nanotube mixture for 10 mins at a pressure of 8.9 mbar;
4) Addition of precursor B to the precursor A/carbon nanotubes mixture.

EXAMPLE

67% by weight of a PDMS matrix containing vinyl terminations,
31% by weight of a VQM matrix containing vinyl groups,
1% by weight of single-wall and/or multi-wall nanotubes,
0.14% by weight of platinum-based catalyst,
cyclic composites and volatile low molecular weight silicone and xylene,
is added, after degassing at a pressure of 8.9 mbar for 10 mins,
1 part of precursor B which contains:
60% by weight of an Si—H polymer,
39% by weight of a PDMS matrix containing vinyl terminations,
1% by weight of a methyl cyclotetra siloxane reticulation inhibitor.

The reticulation is then produced by putting the element covered with the precursor A/precursor B mixture, that is, preferably aluminium plates, at 105° C. for at least six hours.

The application of the composition on aluminium plates, for example in the form of a coating, may be done according to various embodiments.

A first method of applying the coating consists of spraying the composition according to the invention over the aluminium plates of a size of 145*145 mm. This represents 120 g of composition per plate.

A second method of applying the coating consists of casting the composition according to the invention over the aluminium plates coated with primer. The surface is then levelled with a spatula in order to obtain the right thickness of coating. In this method, the top part of the mould (FIG. 8) is not attached.

A third method of applying the coating consists of applying the composition according to the invention with a brush.

The thicknesses of coating thus obtained are 3 or 4 mm for the first and second methods of applying the coating and 2 mm for the third embodiment.

Figure 9:
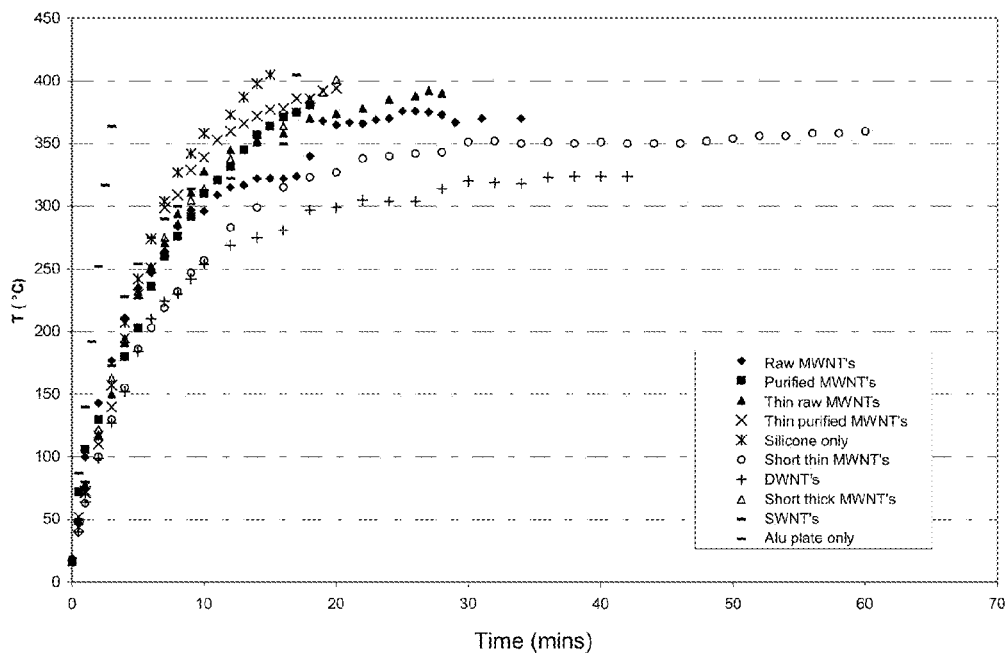
FIG. 9 shows the increase in temperature of an aluminium plate without any coating and of an aluminium plate covered with a coating according to the invention (thickness between 2 and 4 mm) containing 1% by weight of nanotubes of SWNT or MWNT types.
Figure 10:
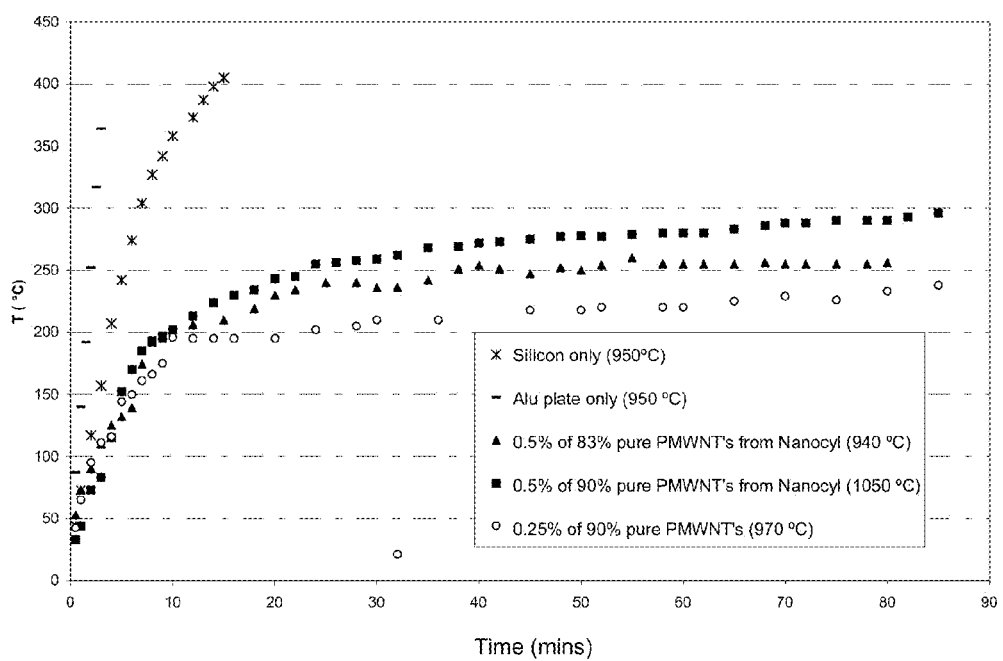
FIG. 10 shows the increase in temperature of an aluminium plate without any coating and of aluminium plates covered with a coating (thickness between 2 and 4 mm) containing 0.25% and 0.5% by weight of nanotubes of MWNT type.
Figure 11:
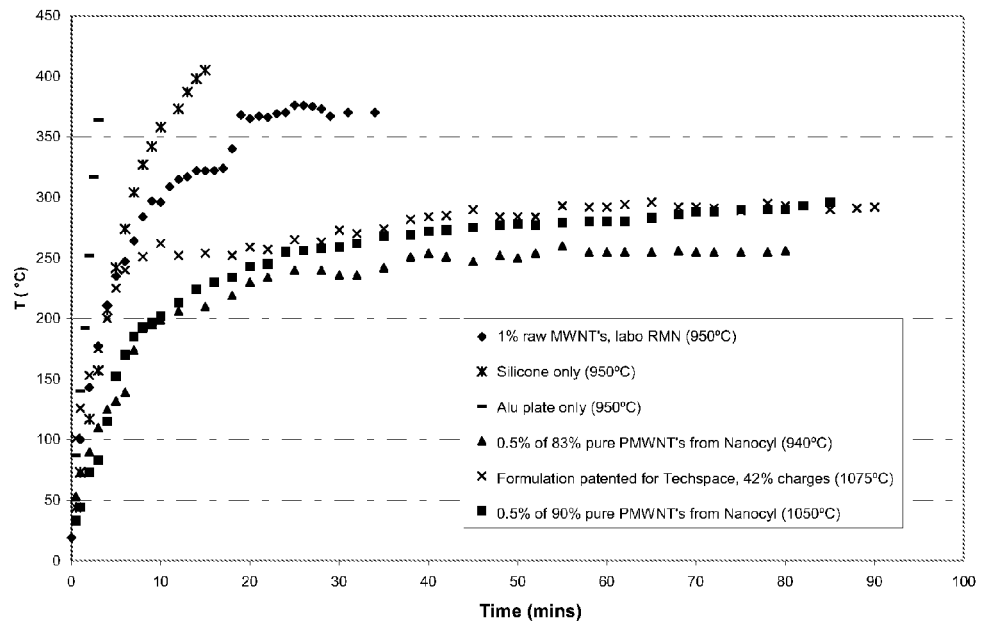
FIG. 11 shows the increase in temperature of an aluminium plate without any coating and of aluminium plates covered with a coating (thickness between 2 and 4 mm) containing 0.5% and 1.0% by weight of nanotubes of MWNT type of different purities.
Figure 12:
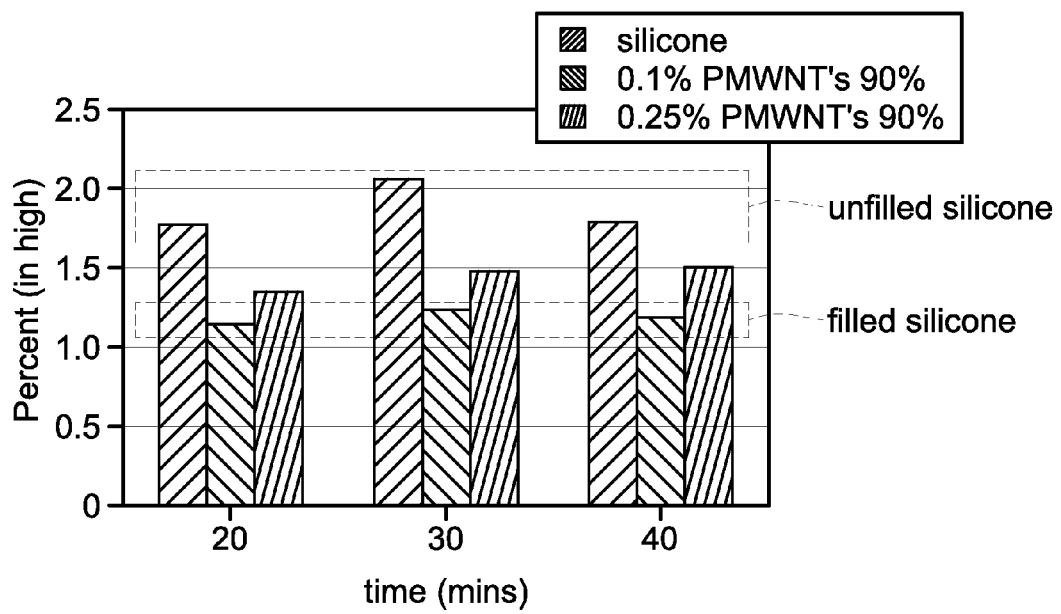
FIG. 12 shows the link between the temperature measured in the centre of the test plate and that measured at one end of this same plate for various fire-resistant compositions (thickness between 2 and 4 mm).

As FIGS. 9 to 11 show, the fire resistance of an aluminium plate covered with a composition containing carbon nanotubes is significantly improved in comparison with a bare aluminium plate or with an aluminium plate covered with the polymer only.

Among the compositions containing 1% by weight of carbon nanotubes (FIG. 9), a distinction may be made between the various carbon nanotubes used. Those that give a better fire resistance are, in order of importance, DWNTs (double-wall nanotubes), MWNTs and lastly "thin MWNTs." Moreover, it appears clearly from the results in FIG. 9, that it is the carbon nanotubes referred to as "raw," whether they be MWNTs or thin MWNTs, that provide a better fire resistance over time. These "raw" carbon nanotubes are nanotubes that have not gone through any post-synthesis treatment and which have a great affinity with the polysiloxane matrix.

A significant improvement in fire-resistant properties is obtained for compositions containing 0.5% to 0.25% by weight of carbon nanotubes. This improvement is even still significant at 0.05% by weight of carbon nanotubes. Here again the best results are obtained with "raw" carbon nanotubes that have not gone through any post-synthesis treatment and which have a great affinity with the polysiloxane matrix.

Temperature measurements are taken at the centre of the test plate as well as at one of the ends of this same plate. A value R is determined as follows: R=Tc/Te, Tc being the temperature measured at the centre of the test plate and Te the temperature measured at the end of the test plate.

If R=1, this means that there is a quick and major dissipation of the heat on the plate, whereas if R>1, this means that the dissipation of the heat is low.

As FIG. 11 shows, the use of carbon nanotubes in a silicone polymer allows a better heat dissipation. Moreover, it is advantageous to use 0.25% by weight of carbon nanotubes or even 0.1%, a value for which the heat dissipation gets close to the optimum value (R=1).

Figure 13:
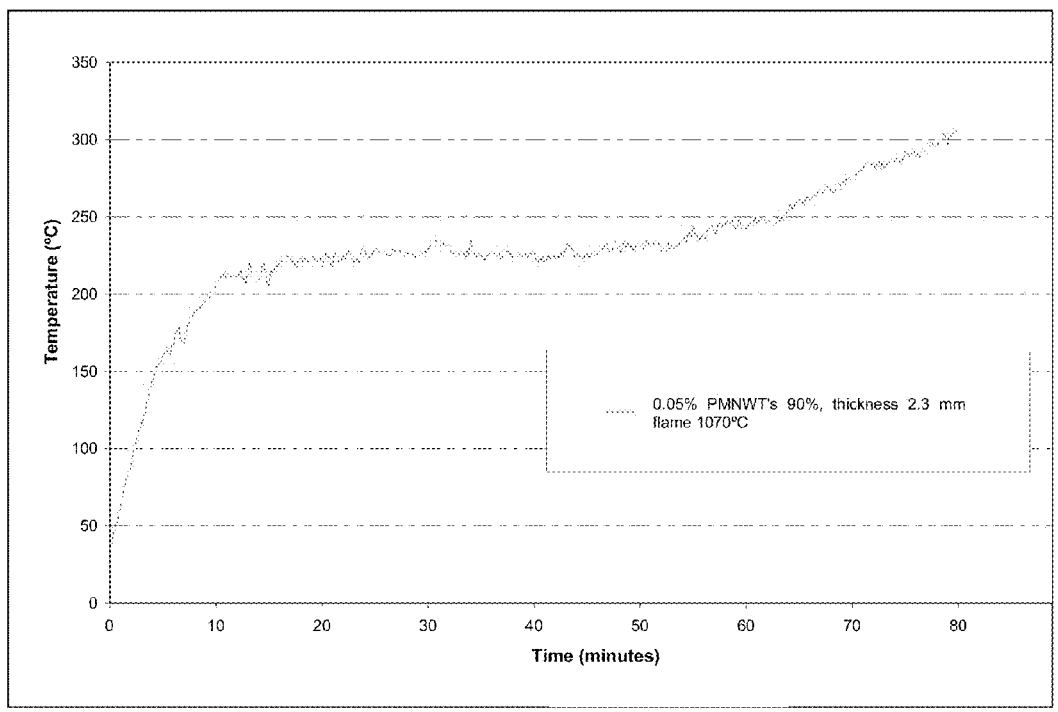
FIG. 13 shows the increase in temperature of an aluminium plate covered with a coating (thickness 2.3 mm and a flame temperature of 1,070° C.) containing 0.05% by weight of raw carbon nanotubes of MWNT type. The improvement effect in fire resistance is clearly noticeable even with such a low concentration of carbon nanotubes. The test sample keeps its temperature below 250° C. for up to 60 minutes.

To determine a minimum level of carbon nanotubes at which an improvement in the fire resistance of the PDMS could be noticed, a concentration of 0.05% by weight of multi-wall carbon nanotubes was tested. FIG. 13 shows that the protective effect of the aluminium plate is still clearly present for a period of 60 minutes.

Moreover, the application of a stress or a pressure to a polymer composition changes its viscosity. It is then possible to select the filler level of carbon nanotubes that corresponds to the desired viscosity for using the composition according to the invention in an extrusion gun of a sealing or mastic gun type. In such a device, the pressure applied to the piston changes the viscosity of the composition and makes it more fluid, allowing it to be easily applied. As soon as the pressure stops, the viscosity of the product changes again and the composition congeals and no longer flows.

The invention claimed is:
1. A method for obtaining a composition comprising a reticulated resin, the method comprising:
   a) forming a first precursor comprising i) a polysiloxane containing vinyl groups and ii) carbon nanotubes;
   b) adding a second precursor comprising a polysiloxane with hydrosilane groups to the first precursor to form a precursor mixture; and
   c) reticulating the precursor mixture to form the reticulated resin,
   the carbon nanotubes present in an amount between 0.05 and 1% by weight of the composition.
2. A method according to claim 1, wherein reticulation is brought about by a thermal, chemical or photochemical action.
3. A method according to claim 1 in which the proportion by weight of the carbon nanotubes is between 0.25 and 0.5% of the weight of the composition.
4. A method according to claim 1, wherein the method further comprises degassing the first precursor prior to adding the second precursor.
5. A method according to claim 4, wherein the degassing is done by vacuum.
6. A method according to claim 1, wherein the reticulating is done by hydrosilyation.
7. A method according to claim 6, wherein the hydrosilyation is performed under thermal action.
8. A method according to claim 7, wherein the composition has a bound rubber value greater than or equal to 15 grams per gram of carbon nanotube.
9. A method according to claim 7, wherein the hydrosilyation is performed at 105° C.
10. A method according to claim 6, wherein the hydrosilyation is performed on aluminium plates.
11. A method according to claim 10, wherein the precursor mixture is applied to the aluminium plates to form a coating.
12. A method according to claim 11, wherein the coating is applied by spraying.
13. A method according to claim 11, wherein the coating is applied by casting.
14. A method according to claim 11, wherein the coating is applied with a brush.
15. A method according to claim 1, wherein the carbon nanotubes are post-synthesis treatment-free multiple wall carbon nanotubes.
16. A method according to claim 1 wherein the composition is a fire-resistant protective coating or a fireproof seal.

* * * * *